S. C. WARNER.
BEET TOPPER.
APPLICATION FILED JAN. 11, 1921.

1,423,374.

Patented July 18, 1922.

WITNESSES

INVENTOR
SYLVESTER C. WARNER
BY
ATTORNEYS

UNITED STATES PATENT OFFICE.

SYLVESTER C. WARNER, OF McCLURE, OHIO.

BEET TOPPER.

1,423,374. Specification of Letters Patent. Patented July 18, 1922.

Application filed January 11, 1921. Serial No. 436,586.

*To all whom it may concern:*

Be it known that I, SYLVESTER C. WARNER, a citizen of the United States, and a resident of McClure, in the county of Henry and State of Ohio, have invented a new and Improved Beet Topper, of which the following is a full, clear, and exact description.

The present invention relates to new and useful improvements in agricultural machines, and it pertains more particularly to that class of machines commonly known as beet lifters.

The invention contemplates an improvement in beet lifters, said improvement being in the form of a topping mechanism adapted to remove the leaves or tops of beets before the same are dug by the lifting mechanism.

It is one of the objects of the invention to provide a device of this character which is constructed in such a manner that the topping knife will follow the surface contour of the ground upon which it is operated in order that the knife may be set to cut a predetermined height above the ground regardless of the surface conformation thereof, thus insuring a uniform topping of the beets.

It is a further object of the invention to so construct a device of this character that it is capable of universal use with various different beet-lifting machines.

With the above and other objects in view, reference is had to the accompanying drawings, in which—

Figure 1:
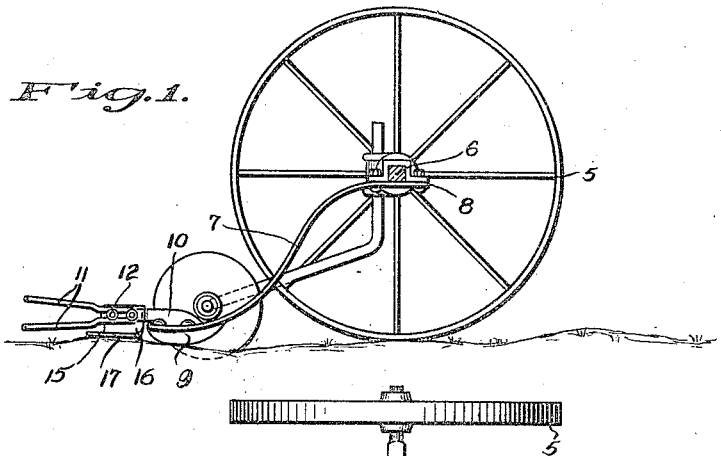
Figure 1 is a sectional view of a beet-lifting machine showing one form of the invention in place thereof.

Referring more particularly to the drawings, the reference character 5 designates one of the wheels of the machine, of which there are two, and 6 designates the axle upon which said wheels are mounted. In this form of the invention the rearwardly projecting spring arm 7 is attached by means of clips 8 to the axle 6, and carried by said rearwardly-projecting spring arm 7 is a ground-engaging shoe 9, said shoe 9 being secured to the arm 7 in any desired manner.

Figure 2:
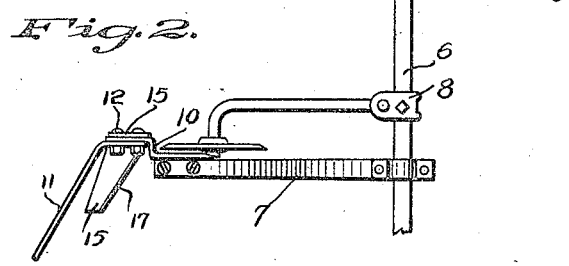
Fig. 2 is a top plan view of the form shown in Fig. 1.

Projecting vertically and rearwardly from the spring arm 7, is a bracket 10, and carried by said bracket 10, are fingers 11, said fingers being secured to the bracket 10 by means of bolts 12. Carried by the bracket 10 and secured thereto by the same bolts 12 which secure the fingers 11 thereto, is a cutter or the like 15, said cutter being bent downwardly as indicated at 16, and having a cutting edge 17 which lies in a horizontal plane to the rear of the shoe 9. As more clearly shown in Fig. 2, this cutting edge 17 is angularly disposed with respect to the path of travel of the cutter 15 in order that a wiping cut may be had. In this form of the invention, as the beet lifter is moved through the field, it will be seen that the cutter 17 operates in a horizontal plane to remove the tops of the beets before the said beets are operated upon by the digging or lifting mechanism. Owing to the resiliency of the arm 7, the shoe 9 is maintained at all times in contact with the surface over which it moves, thus raising and lowering the knife, which, as heretofore stated, is carried by the rear end of the resilient arm 7.

Figure 3:
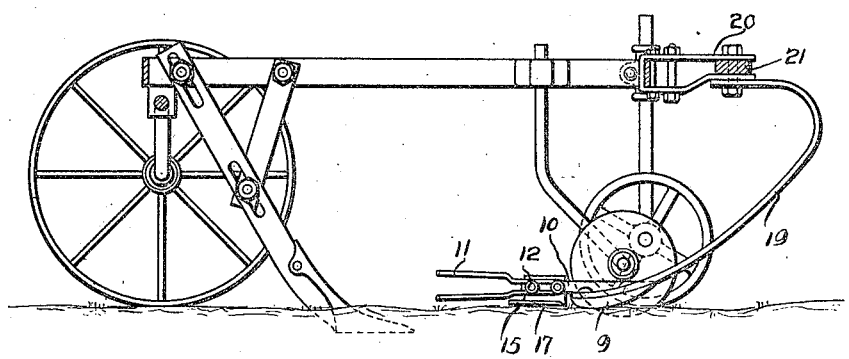
Fig. 3 is a side elevational view in section of a modified form of the invention.

In the form of the invention shown in Fig. 3, the shoe 9 is carried upon the lower rear end of a resilient member 19, said resilient member 19 being secured to the brackets 20, within which the doubletree or other element of the draft appliance 21 is attached. In this form of the invention the operation of the same is as previously described, it being understood that in each form the fingers 11 serve to convey the tops after they have been severed, to a point between the rows of beets where they are deposited and subsequently gathered for various purposes.

It is obvious that the spring arm may be connected to any portion of the machine most convenient, depending, of course, upon the type of machine with which the attachment is used. Furthermore, it is apparent that in lieu of the ground-engaging shoe 9, a wheel or other suitable device may be employed.

From the foregoing, it is apparent that the present invention provides a new and novel means for topping beets, which means is adapted for use with beet-digging machines of various types.

I claim:

1. A topping attachment for vegetable digging machines comprising a resilient arm rigidly attached to the frame of the machine and extending downwardly and rearwardly thereof, a ground-engaging shoe carried by said resilient arm, and a knife carried by said shoe, said knife being mounted to the rear thereof.

2. A topping machine for vegetable digging machines comprising a resilient arm adapted for attachment to the frame of the machine, a ground-engaging shoe carried by the resilient arm, cutting means carried by the shoe, and top-directing fingers carried by said cutting means.

3. A top-cutting mechanism for vegetable digging machines, comprising a resilient arm attached to the frame of the machine and projecting downwardly and rearwardly therefrom, ground-engaging means carried by the rear end of said arm, a bracket carried by the rear end of said arm, a knife carried by the bracket, means for securing the knife to the bracket, and a plurality of top-directing fingers carried by the bracket, said top-directing fingers being secured to the bracket by the knife-securing means.

4. A topping attachment for vegetable-digging machines comprising a resilient arm adapted for securement to the machine, a ground-engaging shoe carried by said resilient arm, and cutting means carried by said ground-engaging shoe.

5. A topping attachment for vegetable-digging machines comprising a resilient arm rigidly attached to the frame of the digging machine, a ground-engaging shoe carried by the resilient arm, and a cutter adapted to trail said shoe, said cutter being angularly disposed with respect to the line of travel of said ground-engaging shoe.

6. A topping attachment for vegetable-digging machines comprising a resilient arm, means for attaching said arm to a machine, a ground-engaging shoe carried by said arm, a cutting means carried by said shoe, and a plurality of fingers adapted to direct the cut tops out of the path of travel of the digging implement.

7. A digging attachment for vegetable-digging machines comprising a resilient arm, a ground-engaging shoe carried thereby, a cutter, and means disposed at the rear of said cutter for directing the cut tops out of the path of travel of the digging implement.

8. A topping attachment for vegetable-digging machines comprising a resilient arm, a ground-engaging shoe carried by said arm and maintained in engagement with the ground through the resiliency of said arm, a cutter, and means carried by the cutter and angularly disposed with respect thereto to move the cut tops out of the path of travel of the digging implement of the machine.

SYLVESTER C. WARNER.